Patented Sept. 14, 1954

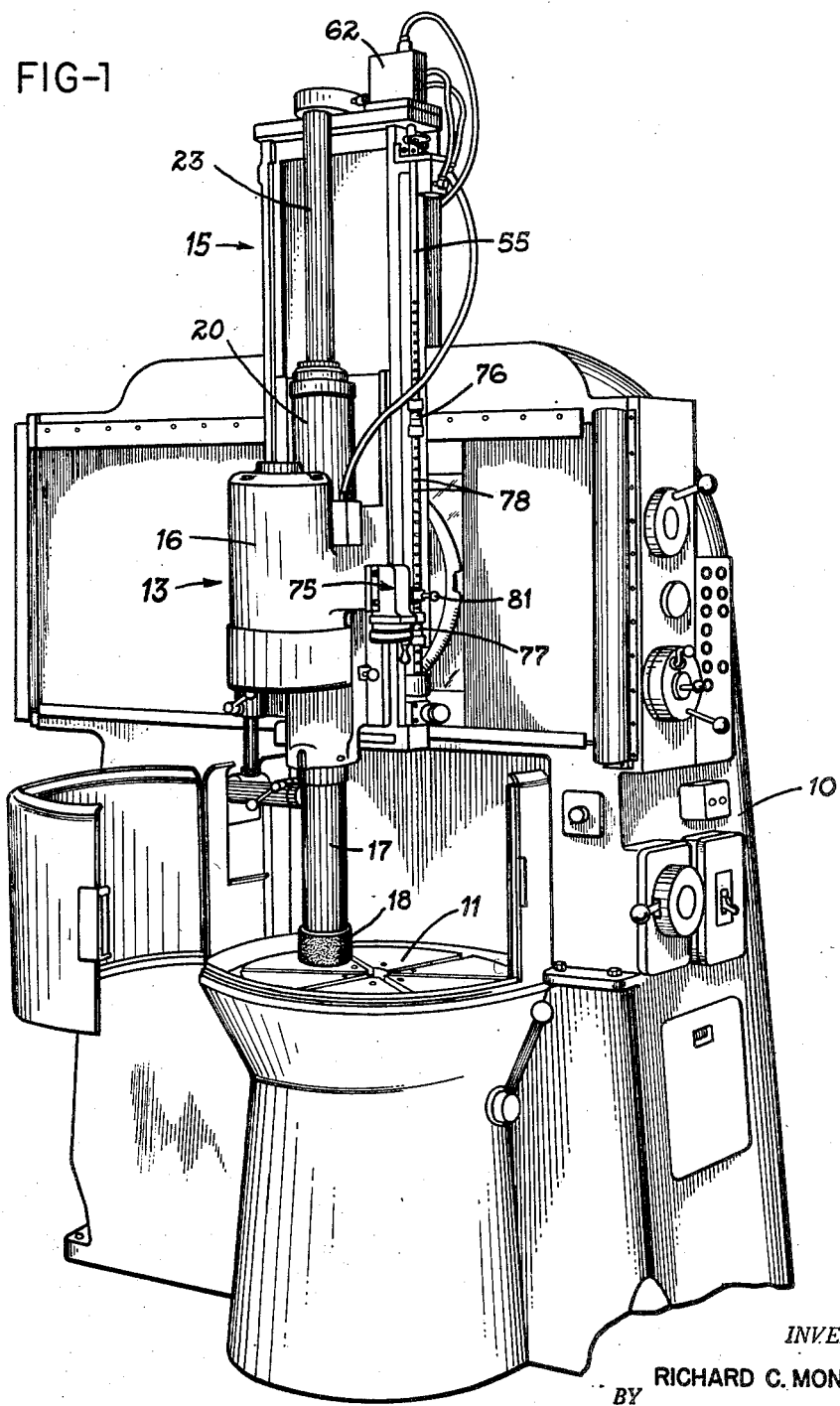

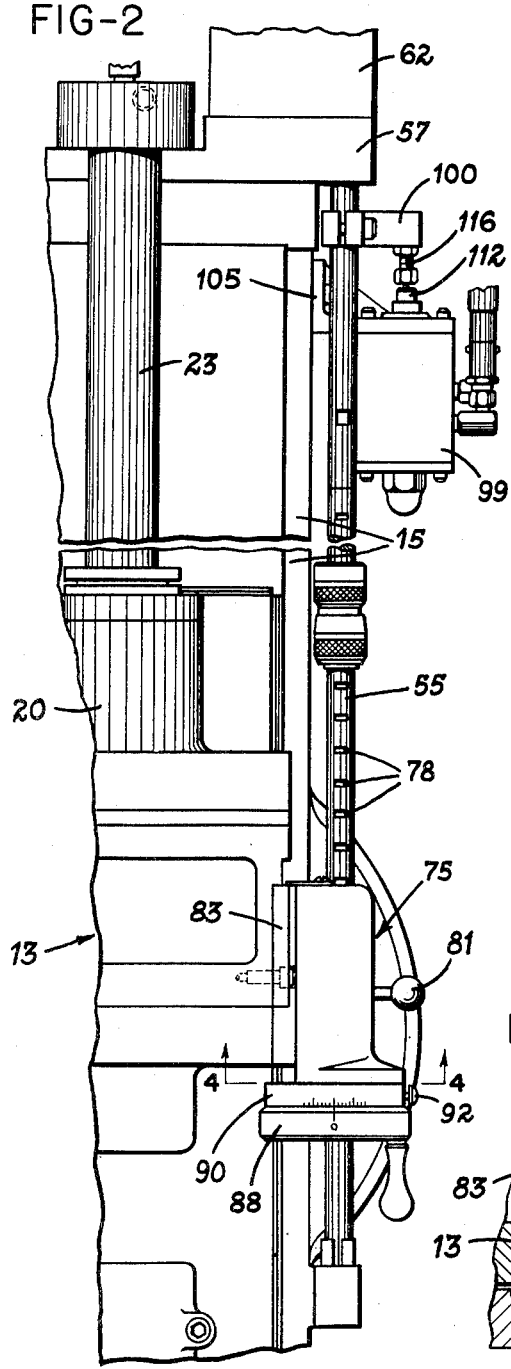
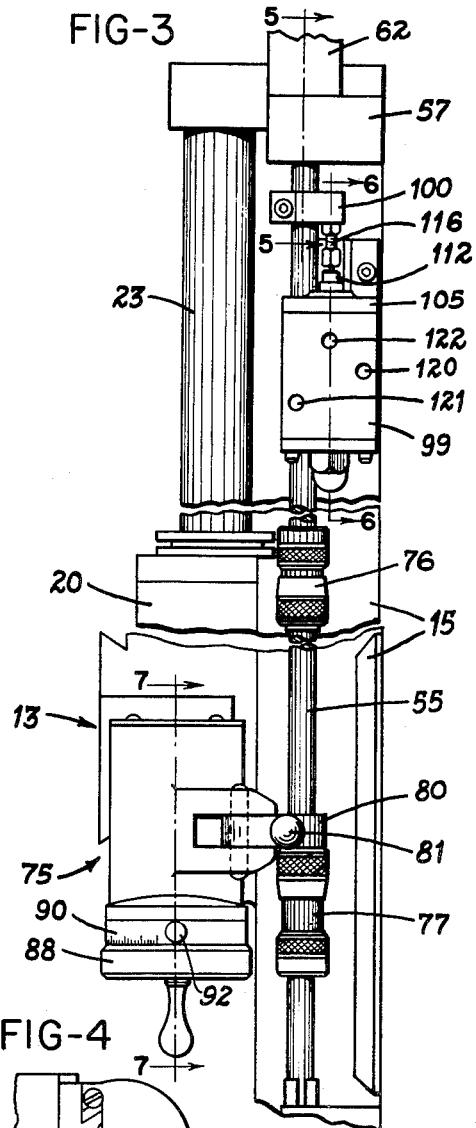
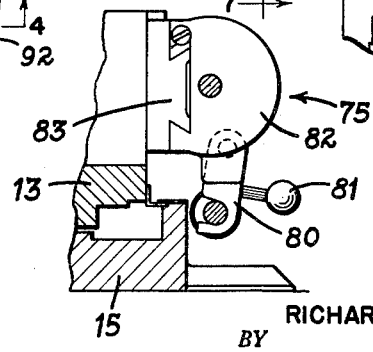

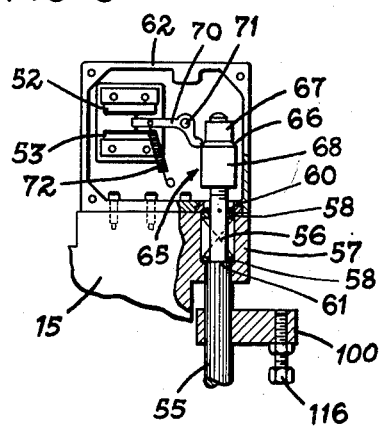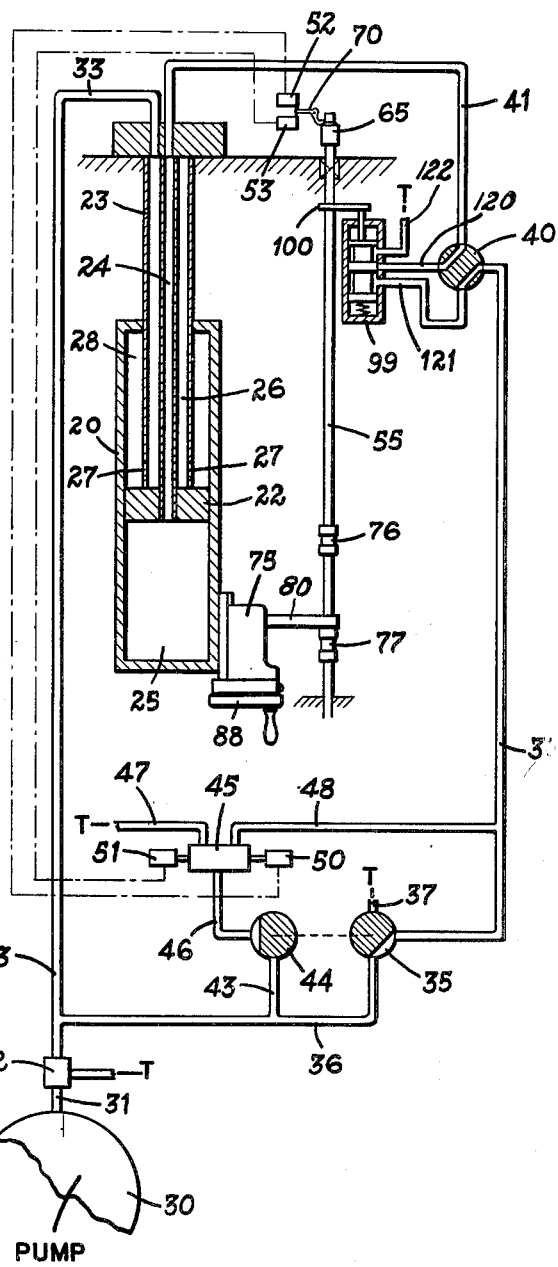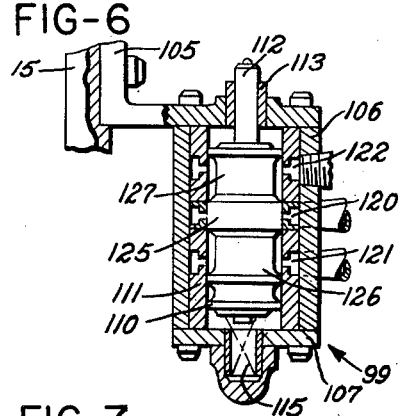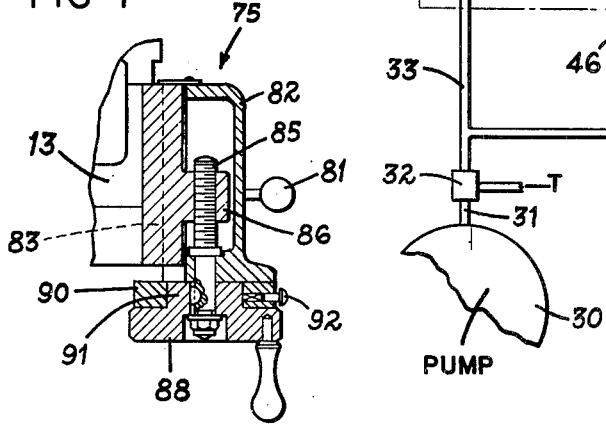

2,688,825

UNITED STATES PATENT OFFICE 2,688,825

MACHINE TOOL CONSTRUCTION

Richard C. Montanus, Springfield, Ohio, assignor to The Springfield Machine Tool Company, Springfield, Ohio, a corporation of Ohio Application October 22, 1952, Serial No. 316,153

5 Claims. (Cl. 51—50)

This invention relates to grinding machines, and more particularly to grinding machines of the type wherein a grinding head is caused to reciprocate with respect to a workpiece for grinding either the inside or the outside of a workpiece.

The invention is especially related to the control of the means of the grinding head with respect to the work in grinding machines of this general type, and a primary object of the invention is to provide a grinding machine having a control apparatus which will enable the operator to regulate the depth of grinding with a high degree of accuracy, and particularly which will enable the operator to increase the depth of grinding by small and accurately measured increments without first backing the grinding head away from the work.

A further object of the invention is to provide a grinding machine of the reciprocating head type in which the grinding head can be caused to dwell or float while in contact with or closely adjacent the work and can then be caused to move in either of its directions of reciprocation in small and accurately measured increments while in contact with the work, thereby enabling the operator to regulate the depth of grinding with a high degree of accuracy in a minimum time.

It is also an object of the invention to provide a grinding machine of the reciprocating head type in which at the option of the operator, the grinding head will reciprocate under electrical control between predetermined limit positions respectively advanced to and retracted from the work or will operate under hydraulic control such that the head dwells in its advanced position and can then be caused to move back and forth as desired with respect to this dwell position in accurately measured and controlled increments without returning to its retracted position.

Other objects and advantages of the invention will be apparent from the following description, the accompanying drawings and the appended claims.

In the drawings—

Fig. 1 is a perspective view showing a grinding machine constructed in accordance with the invention;

Fig. 2 is a fragmentary view of the grinding machine in front elevation;

Fig. 3 is a similar fragmentary view looking from right to left in Fig. 2;

Fig. 4 is a fragmentary section on the line 4—4 of Fig. 2;

Fig. 5 is a fragmentary section on the line 5—5 of Fig. 3;

Fig. 6 is a fragmentary section on the line 6—6 of Fig. 3;

Fig. 7 is a fragmentary section on the line 7—7 of Fig. 3; and

Fig. 8 is a schematic hydraulic and electrical diagram.

Referring to the drawings, which illustrate a preferred embodiment of the present invention, the main base 10 of the grinding machine supports a chuck 11 for holding the work to be ground. The grinding head 13 is mounted for reciprocation with respect to chuck 11 on a frame 15 which is in turn mounted on base 10 for lateral and angular adjustment with respect to the chuck in accordance with the particular grinding operation to be performed. The grinding head includes an electric motor 16 for driving the spindle 17 shown as carrying a grinding wheel 18.

The grinding head 13 and frame 15 are provided with a double acting hydraulic cylinder and piston for effecting their relative reciprocating movements. Referring particularly to Figs. 1 and 8, the head 13 includes a hydraulic cylinder 20 cooperating with a piston 22 on the lower end of a piston rod 23 with the upper end fixed to the frame 15. The piston and piston rod 23 include an internal passage 24 for conducting hydraulic fluid to the chamber 25 in the cylinder on the large area side of the piston 22, and the piston rod also includes a passage 26 connecting at 27 with the chamber 28 on the small area side of the piston. The passage 26 is continuously connected to a supply of hydraulic fluid under pressure, as indicated in Fig. 8 by the pump 30, line 31 having a relief valve 32 therein, and line 33, and thus pressure is continuously applied in chamber 28 to urge the grinding head upwards.

The movements of the grinding head on frame 15 are determined by the pressure condition in cylinder chamber 25. If this chamber is connected to the supply tank so that the pressure therein is relieved, the grinding head will move upwardly due to the continuous pressure in chamber 28, but if chamber 25 is connected to the same line pressure as chamber 28, the head will move downwardly by reason of the greater piston area in chamber 25. If on the other hand, chamber 25 is maintained full of hydraulic fluid while disconnected from both line pressure and tank, the head will remain stationary. Fig. 8 shows a manually controlled hydraulic system for thus effecting reciprocation of the grinding head, which includes a three-way valve 35 having a connection 36 with pump 30, a connection 37 back to the tank, and a line 38 to a four-way valve 40 from which a line 41 leads to the passage 24 and cylinder chamber 25.

Fig. 8 also shows an automatic hydraulic system for effecting reciprocation of the grinding head. A connection 43 leads from the line 36 to a two-way valve 44 which is mechanically connected with valve 35 to open when valve 35 is shifted to its closed position and thus to open a connection from line 36 to a three-way solenoid operated valve 45 through a line 46. The valve 45 is provided with a connection 47 to the tank and a connection 48 to the line 38, and it is operated by a pair of solenoids 50 and 51 each of which is in turn controlled by one of the normally open limit switches 52 and 53 mounted at the top of the frame 15 and operated in response to the movements of the grinding head. The arrangement of this valve 45 and the solenoids is such that when solenoid 50 is energized, the valve is in a position connecting line 46 with line 48 and closing the tank connection 47, and when solenoid 51 is energized, the valve will be in a position closing the pressure line 46 and connecting line 48 with tank connection 47. If both solenoids are deenergized the valve will remain in the position to which it is shifted by the last solenoid to be energized.

The limit switches 52 and 53 are operated in response to movement of a rod 55 carried by the frame 15 for limited vertical movement and normally supported in centered position by a spring 56 (Fig. 5) carried in a boss portion 57 of the top of the frame 15. This spring 56 operates through washers 58 against a collar 60 pinned on rod 55 and a shoulder 61 on the rod. The switchbox 62 is bolted on top of boss 57, and the upper end of rod 55 extends into this box as shown in Fig. 5 and carries a cam 65 for operating the limit switches.

As shown, the cam 65 has a tapered intermediate section 66 between upper and lower cylindrical portions 67 and 68 of respectively small and large diameter. These cam portions operate a control lever 70 for the limit switches, which is pivoted at 71 in the switch box and is spring loaded by a spring 72 in counterclockwise direction as viewed in Fig. 5 to urge its lower end portion into contact with cam 65. The arrangement is such that when lever 70 engages the tapered cam portion 66, both limit switches are released so that both solenoids are deenergized. If rod 55 is raised, lever 70 will be moved in clockwise direction against spring 72 to operate switch 52 and thus to energize solenoid 50 and cause valve 45 to connect chamber 25 to line pressure so that the grinding head will move down. Conversely, if rod 55 is moved down, lever 70 will move in counterclockwise direction to operate switch 53 and thus to energize solenoid 51 and cause valve 45 to connect chamber 25 with the tank so that the grinding head will move up.

The rod 55 is in turn operated by the grinding head itself, through a stop unit 75 thereon and a pair of stops 76 and 77 adjustably mounted on rod 55. As shown in Fig. 2, the rod has notches 78 thereon adapted for releasable locking engagement with a suitable spring catch (not shown) in each of stops 76 and 77, and these stops also include cooperating threadedly engaged portions providing for micrometer adjustment of the effective stop position between the larger adjustments afforded by the notches 78.

The stop 75 includes an arm 80 pivoted thereon and notched to receive rod 55, and this arm 80 is thus adapted to engage stops 76 and 77 as the grinding head reciprocates. Since stops 76 and 77 are secured to rod 55, contact of stop arm 80 therewith will cause rod 55 to move up or down to operate the limit switches as described. When it is desired to operate the machine manually, the stop arm 80 may be pivoted out of contact with rod 55, by means of the handle 81 thereon.

Accurate adjusting means are provided for determining the effective position of the stop arm 80 on the grinding head. Referring particularly to Figs. 4 and 7, the arm 80 is pivoted on a slide 82 slidable on a track portion of a base plate 83 bolted to the grinding head. The slide 82 carries an adjusting screw 85 threaded in a boss portion 86 on plate 83 and having an adjusting hand wheel 88 keyed thereto. A scale 90 having a cooperating index on slide 82 is provided for hand wheel 88, the scale 90 being a ring member carried by the hub portion of the hand wheel. In order to reset scale 90 to zero whenever desired, it is shown as adjustable on bushing 91, by means of a friction lock 92. Thus in addition to adjustment of the upper and lower limit positions of the grinding head by movement of the stops 76 and 77 on rod 55 as described, the position of the stop arm 80 on the grinding head can be adjusted by rotation of screw 85 to shift slide 82 on plate 83.

In addition to the manual and electrical controls for the movements of a grinding head, the invention provides a hydraulic control system which makes possible extremely accurate regulation of the movements of the grinding head, and which also makes it possible to adjust the movement of the head while it is in engagement with the work and without requiring backing off such as otherwise would be required in order to readjust lower stop 77. This hydraulic control system includes a hydraulic control valve 99 mounted on the frame 15 and cooperating with a stop arm 100 carried by the upper end of rod 55. This stop assembly operates in cooperation with stop arm 80 and stop 77 to enable the operator to hold the grinding head in a neutral floating or dwell position adjacent the work and then to move either up or down in small and accurately measured increments providing an essentially vernier control over the grinding operation.

Referring to Figs. 6 and 8, the control valve 99 is mounted on the frame 15 by a bracket 105 and includes an outer shell 106 and an end cap 107. Within the valve is a spool 110 mounted for limited axial movement in a bushing 111 and having a stem 112 projecting through a bushing 113 in bracket 105. A spring 15 biases spool 110 towards its upper limit position, and stem 112 is adapted to be engaged and moved against this spring by a bolt 116 projecting downwardly from stop arm 100. Three hydraulic fluid lines and ports connect with the interior of brushing 111. One line and port 121 connect the valve 40 with the lower portion of bushing 111, a second line and port 120 connect the center portion of the bushing with the line 41 which connects valve 40 with chamber 25, and a third line and port 122 connect the upper end of the bushing to the tank. The spool 110 is formed as shown in Fig. 6 with a central circumferential land 125 proportioned to close the port 120 in the centered position of the spool and in slidably sealing engagement with the inner wall of bushing 111 and on either side axially of land 125 is one of a pair of circumferential grooves 126 and 127 each of which is of sufficient axial extent to provide a pressure connection between the port 120 and one or the other of ports 121 and 122 whenever the spool is moved down or up respectively from its centered position.

With this hydraulic valve and system arranged as shown in Figs. 6 and 8, control of the movements of the grinding head by valve 99 is initiated by moving the valves 35 and 40 to the positions shown in Fig. 8, in which the solenoid valve 45 will be ineffective. Assuming that the grinding head is in upper position, the bolt 116 will be out of contact with valve stem 112, and spool 110 will accordingly be biased by spring 115 to its upper position in which groove 126 will connect ports 120 and 121. Line pressure will accordingly be supplied to chamber 25, and the grinding head will move down until arm 80 engages stop 77, whereupon rod 55 will be moved down and thus caused to act through bolt 116 to shift spool 110 down until land 125 closes port 120. In this position of valve 99, chamber 25 will be disconnected from both the line pressure and the tank, and the grinding head will accordingly dwell.

With the valve 99 in this position, the grinding head can be caused to move either up or down by shifting the position of arm 80 on the head through rotation of hand wheel 88 as described, and the movement of the head will be only through the same distance as the movement of the arm 80 thereon. Thus if the hand wheel is rotated in the direction to cause upward movement of slide 82, arm 80 will rise and permit spool 110 to reconnect ports 120 and 121. The head will accordingly resume its downward movement, but this movement will last only until arm 80 again engages stop 77 and causes spool 110 to return to its centered position.

If it is desired to cause controlled upward movement of the head from its dwell position, as may be required for many workpieces, then after the grinding head is brought to a dwell, the hand wheel 88 is rotated in the direction to cause the stop arm 80 to move rod 55 down sufficiently to cause spool 110 to connect ports 120 and 122. When this occurs, the resulting connection of chamber 25 to the tank will permit the grinding head to move up until the rod 55 returns to its centering relationship with spool 110, whereupon the head will again dwell. When finally it is desired to back the head completely away from the work, this is readily done by shifting valve 35 to the position connecting line 38 with the tank connection 37, thus opening a direct connection to the tank from chamber 25 through the ports 120 and 121.

It is thus possible in operation to bring the grinding head into engagement or close proximity with the work, and then after first causing it to dwell, cause it to move further in either direction with respect to the work in small increments accurately predetermined and controlled by the adjusting mechanism in stop assembly 75 and without backing the head away from the work. The control valve 99 as shown is highly sensitive, requiring only the slightest movement away from its centered position for reconnecting the ports and lines as described, and also the scale for the hand wheel 88 is easily made of sufficient size for accurate adjustment and reading. Thus the invention provides quick and accurate control over the work operations of the grinding machine while at the same time providing for reciprocating operation of the head between spaced limit positions under manual or automatic control whenever such mode of operation is desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A control apparatus for a grinding machine having a base supporting a grinding head and a work holder for relative reciprocating movement, comprising double acting hydraulic means carried by said base and head respectively and including hydraulic circuits for effecting reciprocating movement of said head, a control valve connected with said hydraulic circuits, means defining a neutral position of said valve with respect to said circuits wherein said head is caused to dwell and also first and second limit positions wherein said head is caused to move respectively towards and away from said work holder, means mounting said valve on said base, means biasing said valve to said first limit position, movable means on said base for engaging said valve to shift said valve against said biasing means, a stop member on said head adapted to engage said movable means following movement of said head through a predetermined distance toward said work holder to effect said shifting of said valve to said neutral position causing said head to dwell, and manual means on said head operable in said dwell position of said head for adjusting said stop member in either of two directions on said head to cause further shifting of said valve to said first or second limit position respectively and resulting additional movement of said head with respect to said work holder.

2. A control apparatus for a grinding machine having a base supporting a grinding head and a work holder for relative reciprocating movement, comprising double acting hydraulic means carried by said base and head respectively and including hydraulic circuits for effecting reciprocating movement of said head, a control valve connected with said hydraulic circuits, means defining a neutral position of said valve with respect to said circuits wherein said head is caused to dwell and also first and second limit positions wherein said head is caused to move respectively towards and away from said work holder, means mounting said valve on said base, means biasing said valve to said first limit position, a rod mounted for movement on said base into engagement with said valve to shift said valve against said biasing means, a stop member on said head adapted to engage said rod following movement of said head through a predetermined distance toward said work holder to effect corresponding further movement of said rod with respect to said valve and resulting shifting of said valve to said neutral position causing said head to dwell, and manual means on said head operable in said dwell position of said head for adjusting said stop member in either of two directions on said head to cause further movement of said rod and shifting of said valve to said first or second limit position respectively and additional movement of said head with respect to said work holder.

3. A control apparatus for a grinding machine having a base supporting a grinding head and a work holder for relative reciprocating movement, comprising double acting hydraulic means carried by said base and head respectively and including hydraulic circuits for effecting reciprocating movement of said head, a control valve connected with said hydraulic circuits, means defining a neutral position of said valve with respect to said circuits wherein said head is caused to dwell and also first and second limit positions wherein said head is caused to move respectively towards and away from said work holder, means mounting said valve on said base, means biasing said valve to said first limit position, movable means on said base for engaging said valve to shift said valve against said biasing means, a stop member on said head adapted to engage said movable means in the course of movement of said head toward said work holder to effect said shifting of said valve to said neutral position causing said head to dwell, means supporting said stop member for adjustment with respect to said head in the direction of movement of said head to vary the position of said head with respect to said work holder at which said stop member engages said movable means, and a manual control on said head selectively operable in said dwell position of said head for adjusting said stop member towards or away from said work holder to cause further shifting of said valve to said first or second limit position respectively and resulting additional movement of said head with respect to said work holder.

4. A control apparatus for a grinding machine having a base supporting a grinding head and a work holder for relative reciprocating movement, comprising double acting hydraulic means carried by said base and head respectively and including hydraulic circuits for effecting reciprocating movement of said head, a control valve connected with said hydraulic circuits, means defining a neutral position of said valve with respect to said circuits wherein said head is caused to dwell and also first and second limit positions wherein said head is caused to move respectively towards and away from said work holder, means mounting said valve on said base, means biasing said valve to said first limit position, a rod mounted for movement on said base into engagement with said valve to shift said valve against said biasing means, a stop member on said head adapted to engage said rod in the course of movement of said head toward said work holder to move said rod against said valve with resulting shifting of said valve to said neutral position causing said head to dwell, means supporting said stop member for adjustment with respect to said head in the direction of movement of said head to vary the position of said head with respect to said work holder at which said stop member engages said rod, and a manual control on said head selectively operable in said dwell position of said head for adjusting said stop member towards or away from said work holder to cause corresponding further movement of said rod with respect to said valve and resulting shifting of said valve to said first or second limit position respectively and additional movement of said head with respect to said work holder.

5. A control apparatus for grinding a machine having a base supporting a grinding head and a work holder for relative reciprocating movement, comprising double acting hydraulic means carried by said base and head respectively and including hydraulic circuits for effecting reciprocating movement of said head, a control valve connected with said hydraulic circuits, means defining a neutral position of said valve with respect to said circuits wherein said head is caused to dwell and also first and second limit positions wherein said head is caused to move respectively towards and away from said work holder, means mounting said valve on said base, means biasing said valve to said first limit position, a rod mounted for movement on said base into engagement with said valve to shift said valve against said biasing means, a stop on said rod and a cooperating stop member on said head adapted for relative engagement in the course of movement of said head toward said work holder to move said rod against said valve with resulting shifting of said valve to said neutral position causing said head to dwell, means supporting said stop for adjustment on said rod in accordance with the approximate desired distance of movement for said head, means supporting said stop member for finely calibrated adjustment with respect to said head in the direction of movement of said head to vary the position of said head with respect to said work holder at which said stop member engages said stop, and a manual control on said head selectively operable in said well position of said head for effecting said adjustment of said stop member towards or away from said stop to cause further shifting of said valve to said first or second limit position respectively and resulting additional movement of said head with respect to said work holder.

References Cited in the file of this patent

UNITED STATES PATENTS

| Number | Name | Date |
|---|---|---|
| 1,948,468 | Ferris | Feb. 20, 1934 |
| 2,068,889 | Roehm | Jan. 26, 1937 |
| 2,167,758 | Johnson | Aug. 1, 1939 |
| 2,473,741 | Wilder | June 21, 1949 |
| 2,580,062 | Adams | Dec. 25, 1951 |
| 2,610,614 | Sedgwick | Sept. 16, 1952 |